United States Patent
Meyers et al.

(10) Patent No.: US 6,674,995 B1
(45) Date of Patent: Jan. 6, 2004

(54) ELECTRONICALLY AUGMENTED MULTIPLAYER SPORTING GAME WITH VIRTUAL BALL PASSED BY INFRARED APPARATUS

(75) Inventors: Stephan Meyers, Tampere (FI); Jouka Mattila, Tampere (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/469,291

(22) Filed: Dec. 22, 1999

(51) Int. Cl.$^7$ ................................. H04B 7/00
(52) U.S. Cl. ...................... 455/41.2; 455/466
(58) Field of Search ................. 455/41.2, 466, 455/500, 517; 379/55.1, 39, 42; 463/36, 37, 38, 39

(56) References Cited

U.S. PATENT DOCUMENTS

| | | | |
|---|---|---|---|
| 5,526,401 A | * | 6/1996 | Roach, Jr. et al. |
| 5,618,045 A | | 4/1997 | Kagan et al. |
| 5,738,583 A | | 4/1998 | Comas et al. |
| 5,774,673 A | | 6/1998 | Beuk et al. |
| 5,797,085 A | * | 8/1998 | Beuk et al. ................ 455/88 |
| 5,929,848 A | * | 7/1999 | Albukerk et al. .......... 345/326 |
| 5,950,202 A | | 9/1999 | Durward et al. |
| 5,999,808 A | * | 12/1999 | Ladue ........................ 455/412 |
| 6,099,408 A | * | 8/2000 | Schneier et al. ............ 463/29 |
| 6,285,868 B1 | * | 9/2001 | Ladue ........................ 455/410 |
| 6,301,338 B1 | * | 10/2001 | Makela et al. ........... 379/88.21 |
| 6,327,300 B1 | * | 12/2001 | Souissi et al. .............. 375/219 |
| 6,358,150 B1 | * | 3/2002 | Mir et al. ................... 463/28 |

* cited by examiner

Primary Examiner—Nguyen T. Vo
Assistant Examiner—Tu Nguyen
(74) Attorney, Agent, or Firm—Antonelli, Terry, Stout & Kraus, LLP

(57) ABSTRACT

A method and apparatus for conducting multi-player games in a wireless telecommunications system including a wireless telecommunications network which communicates using radio signals with a plurality of mobile terminals. The objects of the multi-player games are accomplished in the invention by passing a virtual ball between the mobile terminals. The virtual ball can be passed between the mobile terminals by infrared (IR) transmission from IR apparatus included as part of each mobile terminal, by a call being placed through the wireless telecommunications system between mobile terminals, by a Short Message Service (SMS) message which is transmitted by a Short Message Service Center (SMSC) of the wireless telecommunications system, or by short range radio apparatus which operates according to the Bluetooth Standard. The virtual ball could include data or information regarding the game and/or advertising or promotional information regarding products or services being offered. The data or information in the virtual ball is automatically displayed on the display of the mobile terminal upon receiving the virtual ball.

22 Claims, 3 Drawing Sheets

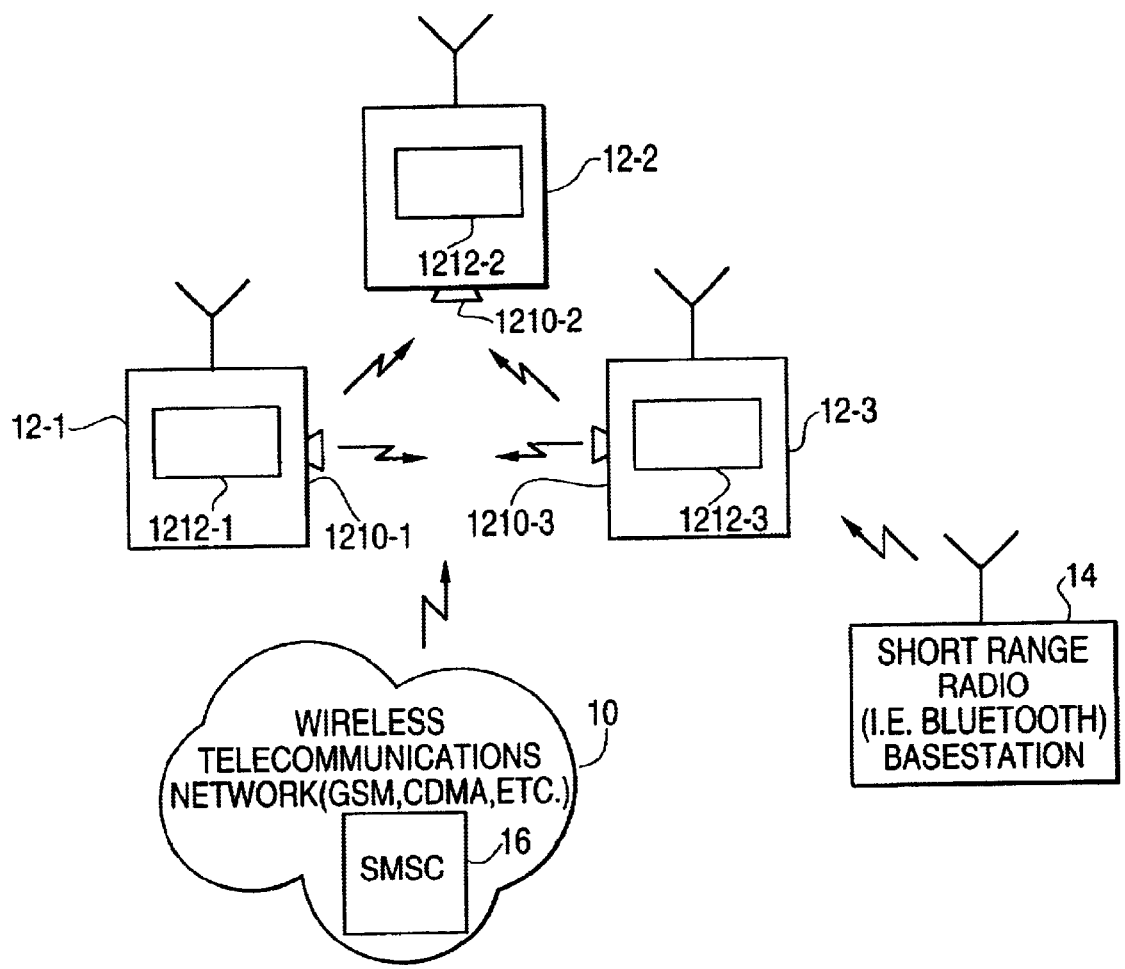

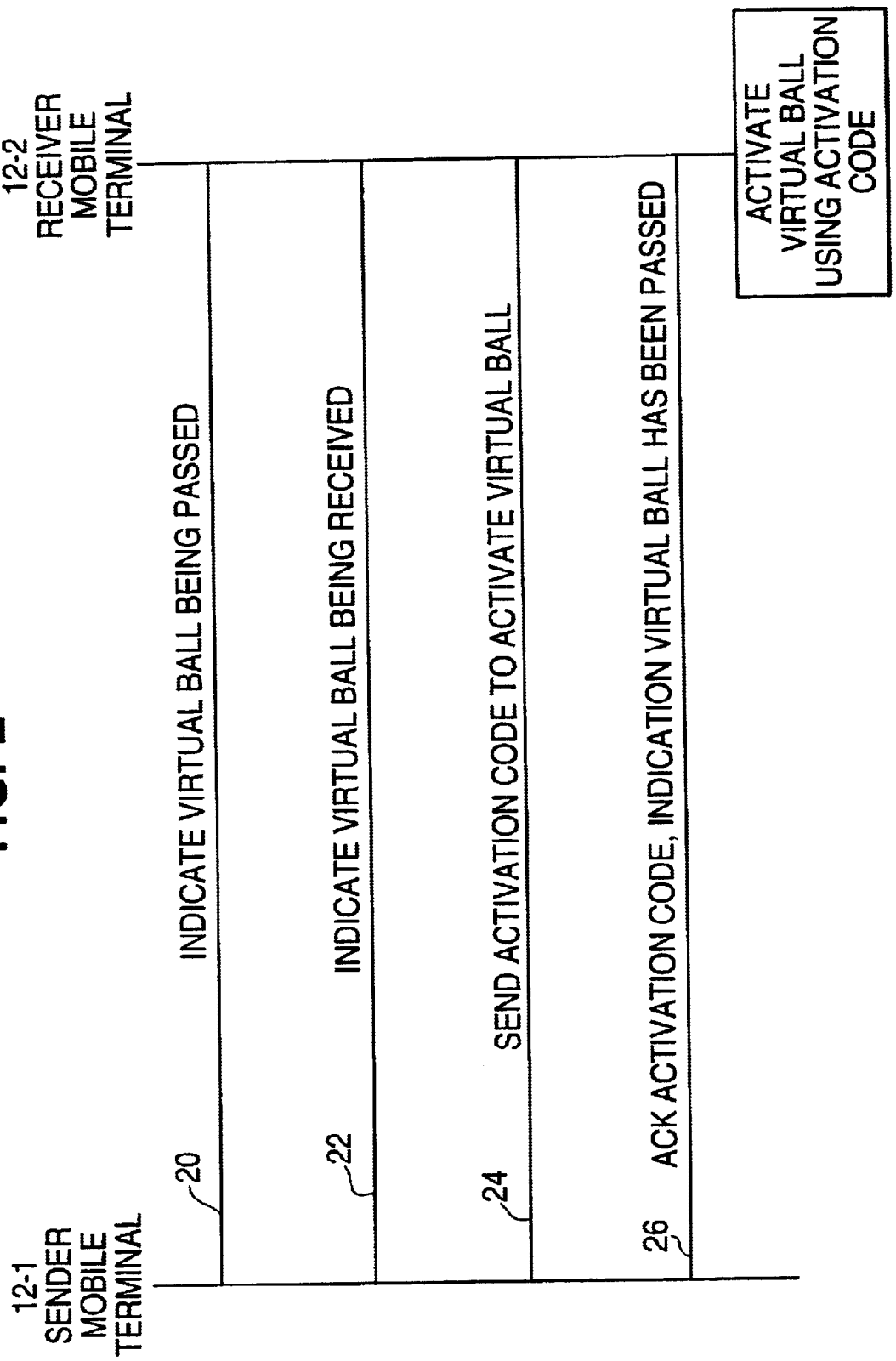

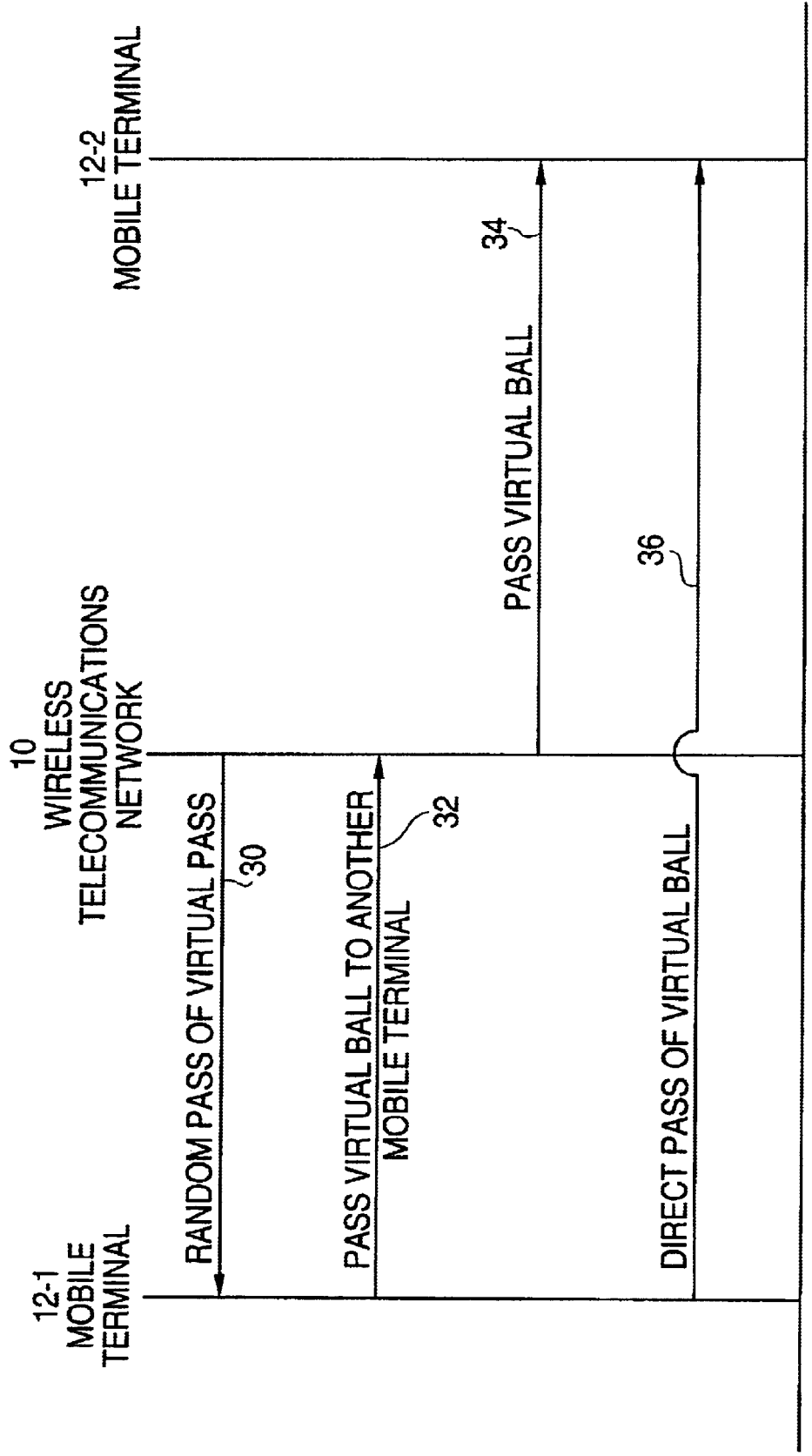

ELECTRONICALLY AUGMENTED MULTIPLAYER SPORTING GAME WITH VIRTUAL BALL PASSED BY INFRARED APPARATUS

BACKGROUND OF THE INVENTION

The present invention relates to a multi-player game using a virtual ball. More particularly, the present invention relates to a multi-player game that can be played using apparatus including wireless mobile terminals operating in a wireless telecommunications system.

Various multi-player games using wireless apparatus have been proposed. These multi-player games typically operate, for example, using infrared transmission and receiving devices that are primarily provided for simulating the shooting of other players or objects. Infrared light transmitted from one such wireless game apparatus (light gun) may strike a target which includes an infrared detector for detecting when the infrared light strikes the target and an infrared transmitter for signaling to the light gun and other apparatus that the infrared from the light gun has hit the target. Typical of such games is "laser tag".

Various apparatus have been proposed regarding infrared data transmission systems, game apparatus and light guns. Examples of such apparatus are disclosed in U.S. Pat. Nos. 3,794,841; 3,870,305; 4,426,662; and 4,799,683.

However, such apparatus may not encourage a significant amount of physical exertion on the part of the players or interaction among the players when the object of the game is to strike a non-moving target. Further, such apparatus require that each of the players to be fitted with special custom apparatus specifically designed to interact with each other to effect the game play. This is particularly inherent in games such as laser tag. Still further, such apparatus do not transmit as part of the infrared light signal data or information which could, for example, cause the target to perform particular operations such as displaying a display the data or information included in the infrared light signal.

SUMMARY OF THE INVENTION

The present invention provides a method and apparatus for conducting multi-player games in a wireless telecommunications system including a wireless telecommunications network which communicates with a plurality of mobile terminals using radio signals, wherein objects of the games are accomplished by passing a virtual ball between the mobile terminals. In the present invention, passing of the virtual ball between the mobile terminals is accomplished using apparatus included in each mobile terminal, the wireless telecommunications network and/or short range radio apparatus.

In the present invention, the virtual ball could, for example, be passed between mobile terminals by infrared (IR) transmission from IR apparatus included as part of each mobile terminal, by a call being placed between mobile terminals through the wireless telecommunications network, by a Short Message Service (SMS) message which is transmitted by a Short Message Service Center (SMSC) of the wireless telecommunications system or by short range radio apparatus which operates according to, for example, the Bluetooth standard.

According to one embodiment of the present invention when the virtual ball is passed between mobile terminals by IR transmission, a first signal including the virtual ball is transmitted from a first mobile terminal to a second mobile terminal representing the virtual ball being passed from the first mobile terminal to the second mobile terminal. In response to receipt of the first signal in the second mobile terminal, a second signal is sent from the second mobile terminal to the first mobile terminal indicating that the virtual ball has been caught. In response to receipt of the second signal in the first mobile terminal, a third signal is sent from the first mobile terminal to the second mobile terminal including an activation code for activating the virtual ball. In response to receipt of the third signal in the second mobile terminal, a fourth signal is sent from the second mobile terminal to the first mobile terminal acknowledging receipt of the activation code and indicating that the second mobile terminal is now in possession of the virtual ball. Thereafter, in the second mobile terminal the virtual ball is activated using the activation code.

It should be noted that the passing of the virtual ball by IR transmission may not necessarily require that wireless telecommunications mobile terminals be used. Any terminal having IR transmission and receiving apparatus would accomplish the goals of the game.

The virtual ball being passed between the mobile terminals could, for example, be a ball used in a multi-player game having a goal used for scoring. In such a game, the virtual ball can be passed between mobile terminals using the IR apparatus included in each of the mobile terminals. Opposing players could block the passing of the ball using their bodies or other means. One of the mobile terminals can be used as a goal and points are scored by transmitting the virtual ball from the mobile terminal of a player to the goal.

Initiation of game play could occur by randomly selecting a mobile terminal and passing the virtual ball to the selected mobile terminal from a server in the telecommunications system using a call, a SMS message, IR transmission or short range radio signal.

The virtual ball could, for example, include the rules or other information concerning the game and/or data or information such as advertising or promotional offers which are to be viewed or taken advantage of by the players. The data or information contained in the virtual ball could, for example, be automatically displayed on the display of the mobile terminal of the player receiving the virtual ball.

When the virtual ball includes such data or information, the object of the game could be to pass the virtual ball to another player within a preset period of time. By passing the virtual ball to another player within the preset period of time the player could win, for example, promotional items such a discount on the purchase of a product or service being advertised.

BRIEF DESCRIPTION OF THE DRAWINGS

The present invention will be more apparent from the following detailed description, when taken in conjunction with the accompanying drawings, in which:

FIG. 1 is a schematic diagram illustrating a telecommunications system according to the present invention;

FIG. 2 is a diagram illustrating the operations performed by mobile terminals in the telecommunications system according to the present invention; and FIG. 3 illustrates the operations performed by mobile terminals and the wireless telecommunications network according to the present invention.

DETAILED DESCRIPTION OF THE INVENTION

The present invention shall be described using FIGS. 1–3. It should be noted that the present invention as illustrated in FIGS. 1–3 is one example of an embodiment of the present invention. The present invention can be implemented according to any other embodiment known to those of ordinary skill in the art.

The present invention provides a method and apparatus for conducting multi-player games in a wireless telecommunications system such as that illustrated in FIG. 1. The wireless telecommunications system includes a wireless telecommunications network 10 which communicates with a plurality of mobile terminals 12-1 through 12-3 using radio signals. The objects of any of the games played using the apparatus of the wireless telecommunications system are accomplished by passing a virtual ball between the mobile terminals 12-1 through 12-3. One of the mobile terminals, for example, mobile terminal 12-2, could be used as a goal to which the virtual ball is passed to score points. Special goal apparatus can also be provided to permit all of the players having mobile terminals to participate in the multi-player game.

In the present invention, the passing of a signal including a virtual ball between the mobile terminals 12 could, for example, be accomplished using apparatus included in each mobile terminal, the wireless telecommunications network 10 and/or a short range radio base station 14.

One alternative for effecting the passing of the virtual ball between mobile terminals 12 is accomplished using IR light signals. Each mobile terminal 12 as illustrated in FIG. 1 includes infrared (IR) apparatus 1210 which transmits and receives IR light signals. The IR light signals being transmitted to and from a mobile terminal 12 can carry a signal representing a virtual ball. Transmitting the signal from one mobile terminal to another mobile terminal represents passing the virtual ball from the one mobile terminal and catching the virtual ball in the other mobile terminal. Each mobile terminal 12 also includes a display 1212 which is used to display.

The virtual ball included in the IR light signal received by a mobile terminal 12 could, for example, contain information regarding the game including information of one or more of the players of the game and/or advertising or promotional information regarding a product or service. The information contained in a virtual ball is automatically displayed on the display 1212 of the mobile terminal 12.

It should be noted that the passing of the virtual ball by IR transmission may not necessarily require that wireless telecommunications mobile terminals be used. Any terminal having IR transmission and receiving apparatus would accomplish the goals of the game.

Another alternative for effecting the passing of the virtual ball between mobile terminals 12 is accomplished by using the short range radio base station 14 to transmit a signal including the virtual ball between mobile terminals. The short range radio base station 14 can operate, for example, according to the bluetooth standard. The short range radio base station 14 can also be used to initiate the start of the multi-player game. Particularly, the short range radio base station 14 when initiating the start of the multi-player game, randomly selects one of the mobile terminals and passes a signal including the virtual ball to the selected mobile terminal 12. The randomly selected mobile terminal 12 upon receipt of the signal including the virtual ball can then begin the multi-player game by passing a signal including the virtual ball to a teammate. Thereafter, players on the same team cooperate to ultimately pass the virtual ball to the goal to score points. Opposing players can prevent the passing of the signal including virtual ball by blocking the IR light signal with their body or using other means.

Yet another alternative for effecting the passing of the virtual ball between mobile terminals is accomplished by transmitting a signal including the virtual ball via a call established by the wireless telecommunications network 10, between mobile terminals and/or by sending Short Message Service (SMS) messages between mobile terminals using the Short Message Service Center (SMSC) 16 of the wireless telecommunications system.

As described above, a virtual ball can be passed between mobile terminals 12 by use of the IR apparatus 1210 included in each mobile terminal 12. According to FIG. 2, in order to effect the passing of a virtual ball between a first mobile terminal 12-1 and a second mobile terminal 12-2, a first signal 20 including the virtual ball is transmitted from the first mobile terminal 12-1 to the second mobile terminal 12-2 representing the virtual ball being passed from the first mobile terminal 12-1 to the second mobile terminal 12-2. In response to receipt of the first signal 20 in the second mobile terminal 12-2, a second signal 22 is sent from the second mobile terminal 12-2 to the first mobile terminal 12-1 indicating that the virtual ball has been caught. In response to receipt of the second signal 22 in the first mobile terminal 12-1, a third signal 24 is sent from the first mobile terminal 12-1 to the second mobile terminal 12-2 including an activation code for activating the virtual ball. In response to receipt of the third signal 24 in the second mobile terminal 12-2, a fourth signal 26 is sent from the second mobile terminal 12-2 to the first mobile terminal 12-1 acknowledging receipt of the activation code and indicating that the second mobile terminal 12-2 is now in possession of the virtual ball. Thereafter, the second mobile terminal 12-2 activates the virtual ball using the activation code. Each of the first through fourth signals can, for example, be IR light signals transmitted and received by the IR apparatus 1210 included in each of the mobile terminals.

It should be noted that the passing of the virtual ball by IR transmission may not necessarily require that wireless telecommunications mobile terminals be used. Any terminal having IR transmission and receiving apparatus would accomplish the goals of the game. It should be further noted that if SMS messaging is used rather than IR transmissions, confirmations of receipt of messages is inherent in the system. Thus, confirmation signals and confirmation signals are not necessary.

Although not illustrated in FIG. 2, initiation of the game can be accomplished by the wireless telecommunications network 10 or the short range radio base station 14 randomly selecting a mobile terminal 12 and sending a fifth signal including the virtual ball to the selected (first) mobile terminal 12-1. Sending the fifth signal including the virtual ball to the first mobile terminal 12-1 in this manner places the virtual ball in play so that the multi-player game can proceed. Further, as described above, one of the mobile terminals 12-2 or a special goal apparatus (not shown) can be used as a goal for scoring. The goal can also serve a function of enforcing the rules of the multi-player game.

Further, as described above, a signal including the virtual ball can be passed between mobile terminals 12 by use of the wireless telecommunications network 10 or by use of the short range radio base station 14. The wireless telecommunications network 10 can, for example, send the signal including the virtual ball between mobile terminal by placing a call between the mobile terminal 12 and/or by sending SMS messages between the mobile terminals. The short range radio base station 14, can, for example, send the signal including the virtual ball between mobile terminals by transmitting short range radio signals between the mobile terminals. FIG. 3 illustrates the operations performed by the mobile terminals 12 and the wireless telecommunications network 10 or the short range radio base station 14 to cause the passing of the virtual ball between mobile terminals.

FIG. 3 will be described below relative to the wireless telecommunications network 10. However, it should be noted that essentially the same description applies to the case where the wireless telecommunications network 10 is replaced by the short range base station 14.

As illustrated in FIG. 3, the start of a multi-player game can be initiated by the wireless telecommunications network 10 randomly selecting a mobile terminal and passing a first signal including the virtual ball the selected (first) to mobile terminal 12-1. The first signal 30 could, for example, be a call sent from the wireless telecommunications network 10 to the first mobile terminal 12-1 or a SMS message transmitted from the SMSC 16 of the wireless telecommunications network 10 to the first mobile terminal 12-1. Further, the first signal 20 could be a short range radio signal when the short range radio base station 14 is being used rather than the wireless telecommunications base station 10.

The virtual ball of the first signal 30 could, for example, include data or information regarding the multi-player game or advertising or promotional information of a product or service being offered. The data or information included in the virtual ball is automatically displayed on the display 1212 of the mobile terminal 12-1 upon receipt of the signal including the virtual ball. The information concerning the multi-player game could, for example, provide rules of the game to be followed. The rules could, for example, require the user of the first mobile terminal 12-1 to pass the virtual ball to another user of another mobile terminal 12-2 within a preset period of time. The rules could further state that if the virtual ball is passed to another user of another mobile terminal within a preset period of time, then the user of the first mobile terminal 12-1 would receive promotional items. These promotional items could include, for example, discounts on the product or service being advertised.

Thus, according to the above, the user of the first mobile terminal 12-1 can cause the virtual ball to be passed to another mobile terminal by sending a second signal 32 including the virtual ball from the first mobile terminal 12-1 to the wireless telecommunications network 10 representing that the virtual ball is being passed to another mobile terminal 12-2 identified by the user of the first mobile terminal 12-1. The wireless telecommunications network 10 upon receipt of the second signal 32 establishes a connection with a second mobile terminal 12-2 identified by the user of the first mobile terminal 12-1 and sends a third signal 34 including the virtual ball to the second mobile terminal 12-2. The sending of the third signal 34 represents the completion of the passing of the virtual ball from the first mobile terminal 12-1 to the second mobile terminal 12-2.

The second mobile terminal 12-2 upon receipt of the third signal 34 from the wireless telecommunications network 10, automatically displays the data or information contained in the virtual ball on its display 1212-2. The data or information displayed on the display 1212-2 of the second mobile terminal 12-2 informs the rules of the game to the user of the second mobile terminal 12-2. Further, the data or information displayed on the display of the second mobile terminal 12-2 informs the user of the second mobile terminal 12-2 of advertisement and promotional information concerning a product or service. As with the user of the first mobile terminal 12-1, the user of the second mobile terminal 12-2 is offered an incentive in the form of promotional items for passing the virtual ball to still yet another mobile terminal within a preset period of time.

Alternatively, the first mobile terminal 12-1 upon receipt of the first signal 30 including the virtual ball initiating play of the game can, for example, send a fourth signal 36 including the virtual ball directly to the second mobile terminal 12-2 without using the wireless telecommunications network 10. The fourth signal 36 including the virtual ball could, for example, be transmitted by the IR apparatus 1210 included within each of the mobile terminals 12 or by the short range radio base station 14 which operates according to the bluetooth standard.

Thus, according to the above, the present invention provides a method and apparatus for conducting multi-player games in a wireless telecommunications system including a wireless telecommunications network which communicates with a plurality of mobile terminals using radio signals. The objects of the games are accomplished by passing a virtual ball between the mobile terminals. The passing of the virtual ball between the mobile terminals can be accomplished by transmitting and receiving IR light signals to and from IR apparatus included as part of each mobile terminal, by placing a call through the wireless telecommunications system between mobile terminals, by transmitting a SMS message between mobile terminals by a SMSC in the wireless telecommunications system and/or by transmitting short range radio signals between mobile terminals by short range radio apparatus which operates according to the bluetooth standard. The virtual ball could, for example, include data or information such as the rules of the game and/or advertising or promotional information which are automatically displayed on the display of the mobile terminal once the virtual ball has been received. The multi-player games could, for example, be conducted where players pass the virtual ball between mobile terminals with the ultimate goal of passing the virtual ball to a goal for scoring. Alternatively, the multi-player games could, for example, be conducted where the virtual ball includes data or information which is automatically displayed on the display of the mobile terminal and where the virtual ball must be passed to another player within a preset period of time entitling the user of the mobile terminal to promotional items.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. In a wireless telecommunications system including a wireless telecommunications network which communicates using radio signals with a plurality of mobile terminals, a method of conducting a multi-player game, wherein a virtual ball, used to accomplish an object of said multi-player game, is passed among the mobile terminals operated by opposing players or players on a same team, comprising:

transmitting from a first mobile terminal being operated by a first player to a second mobile terminal being operated by a second player a first signal including a virtual ball used to accomplish the object of the multi-player game, said first signal represents said virtual ball being passed from said first mobile terminal to said second mobile terminal;

in response to receipt of said first signal in said second mobile terminal, sending from said second mobile terminal to said first mobile terminal a second signal indicating said virtual ball has been caught;

in response to receipt of said second signal in said first mobile terminal, sending from said first mobile to said second mobile terminal a third signal including an activation code for activating said virtual ball;

in response to receipt of said third signal in said second mobile terminal, sending from said second mobile terminal a fourth signal acknowledging receipt of said activation code and indicating that said second mobile terminal is now in possession of said virtual ball; and activating said virtual ball in said second mobile terminal using said activation code, thereby permitting the second player operating said second mobile terminal to further pursue the object of said multi-player game using said virtual ball, wherein said first, second, third and fourth signals are each different from the other.

2. A method according to claim 1, wherein each mobile terminal includes apparatus for communicating with said wireless telecommunications network and the other mobile terminals using short range radio signals according to the Bluetooth Standard.

3. A method according to claim 1, wherein each mobile terminal includes infrared (IR) apparatus for transmitting and receiving IR light signals, and wherein said first, second, third and fourth signals are IR light signals.

4. In a wireless telecommunications system including a wireless telecommunications network which communicates using radio signals with a plurality of mobile terminals, a method of conducting a multi-player game, wherein a virtual ball is passed among the mobile terminals, comprising:

transmitting from a first mobile terminal to a second mobile terminal a first signal including a virtual ball representing said virtual ball being passed from said first mobile terminal to said second mobile terminal;

in response to receipt of said first signal in said second mobile terminal, sending from said second mobile terminal to said first mobile terminal a second signal indicating said virtual ball has been caught;

in response to receipt of said second signal in said first mobile terminal, sending from said first mobile to said second mobile terminal a third signal including an activation code for activating said virtual ball;

in response to receipt of said third signal in said second mobile terminal, sending from said second mobile terminal a fourth signal acknowledging receipt of said activation code and indicating that said second mobile terminal is now in possession of said virtual ball;

activating said virtual ball in said second mobile terminal using said activation code; and initiating start of the multi-player game by randomly selecting one of said plurality of mobile terminal as said first mobile terminal and transmitting a fifth signal including said virtual ball to said first mobile terminal representing said virtual ball being passed to said first mobile terminal.

5. A method according to claim 4, wherein said fifth signal is transmitted from said wireless telecommunications network as one of a call or a SMS message to said first mobile terminal.

6. A method according to claim 4, wherein said fifth signal is transmitted from a short range radio base station which operates according to the Bluetooth Standard to said first mobile terminal.

7. A method according to claim 4, wherein each of said mobile terminals includes IR apparatus for transmitting and receiving IR light signals, and wherein said first, second, third and fourth signals are IR light signals.

8. A method according to claim 1, wherein said virtual ball included in said first signal includes information which is automatically displayed on a display of a mobile terminal receiving said signal.

9. A method according to claim 4, wherein said virtual ball included in said first signal includes information which is automatically displayed on a display of a mobile terminal receiving said signal.

10. In a wireless telecommunications system including a wireless telecommunications network which communicates using radio signals with a plurality of mobile terminals, a method of conducting a multi-player game, wherein a virtual ball, used to accomplish an object of said multi-player game, is passed among mobile terminal, operated by opposing players or players on a same team, comprising:

receiving in a first mobile terminal being operated by a first player a first signal including a virtual ball used to accomplish the object of the multi-player game, wherein said virtual ball includes information for controlling a mobile terminal to automatically display information on a display of said mobile terminal upon receiving said virtual ball;

in response to receipt of said first signal in said first mobile terminal and based on said information included in said virtual ball controlling said first mobile terminal to automatically display said information included in said virtual ball on a display of said first mobile terminal;

permitting the user of said first mobile terminal to identify a second mobile terminal being operated by a second player to which said virtual ball is to be passed;

transmitting from said first mobile terminal to said second mobile terminal a second signal including said virtual ball representing said virtual ball being passed from said first mobile terminal to said second mobile terminal;

receiving in said second mobile terminal said second signal including said virtual ball; and in response to receipt of said second signal in said second mobile terminal and based on said information included in said virtual ball controlling said second mobile terminal to automatically display said information included in said virtual ball on a display of said second mobile terminal, thereby permitting the second player operating said second mobile terminal to further pursue the object of said multi-player game using said virtual ball, wherein said first and second signals are each different from the other.

11. A method according to claim 10, wherein said first and second signals are transmitted between said first and second mobile terminals by said wireless telecommunications network.

12. A method according to claim 10, wherein each mobile terminal includes IR apparatus for transmitting and receiving IR light signals, and wherein said first and second signals are IR light signals.

13. In a wireless telecommunications system including a wireless telecommunications network which communicates using radio signals with a plurality of mobile terminals, a method of conducting a multi-player game comprising:

receiving in a first mobile terminal a first signal including a virtual ball, wherein said virtual ball includes information to be automatically displayed on a display of a mobile terminal upon receiving said virtual ball;

in response to receipt of said first signal in said first mobile terminal automatically displaying said information included in said virtual ball on a display of said first mobile terminal;

permitting the user of said first mobile terminal to identify a second mobile terminal to which said virtual ball is to be passed;

transmitting from said first mobile terminal to said second mobile terminal a second signal including said a virtual ball representing said virtual ball being passed from said first mobile terminal to said second mobile terminal;

receiving in said second mobile terminal said second signal including said virtual ball;

in response to receipt of said second signal in said second mobile terminal, automatically displaying said information included in said virtual ball on a display of said second mobile terminal; and initiating start of the multi-player game by randomly selecting one of said plurality of mobile terminals as said first mobile terminal and transmitting said first signal including said virtual ball to said first mobile terminal.

14. A method according to claim 13, wherein said first signal is transmitted from said wireless telecommunications network as one of a call or a SMS message to said first mobile terminal.

15. A method according to claim 13, wherein said first signal is transmitted from a short range radio base station which operates according to the Bluetooth Standard to said first mobile terminal.

16. A method according to claim 13, wherein each of said mobile terminals includes IR apparatus for transmitting and receiving IR light signals, and wherein said first and second signals are IR light signals.

17. A method according to claim 10, wherein said virtual ball included in each of said first and second signals includes information which is automatically displayed on a display of a mobile terminal receiving said signal.

18. A method according to claim 13, wherein said virtual ball included in each of said first and second signals includes information which is automatically displayed on a display of a mobile terminal receiving said signal.

19. A method according to claim 17, wherein said information included in said virtual ball includes advertising and promotional information regarding a product or service being offered.

20. A method according to claim 18, wherein said information included in said virtual ball includes advertising and promotional information regarding a product or service being offered.

21. A method according to claim 19, wherein said information included in said virtual ball further includes information concerning the rules of the multi-player game requiring the user of the mobile terminal to pass the virtual ball to another user of another mobile terminal within a preset period of time.

22. A method according to claim 20, wherein said information included in said virtual ball further includes information concerning the rules of the multi-player game requiring the user of the mobile terminal to pass the virtual ball to another user of another mobile terminal within a preset period of time.

* * * * *